F. W. COMPTON.
HAY LOADER.
APPLICATION FILED MAR. 16, 1908.

944,017.

Patented Dec. 21, 1909.
3 SHEETS—SHEET 1.

Witnesses;
P. J. McAlister.
G. A. Olson.

Inventor;
Francis W. Compton.
by
Joshua R. H. Potts.
Atty.

Witnesses:
P. J. McAllister.
A. A. Olson.

Inventor;
Francis W. Compton.
by
Joshua R. H. Potts.
Atty.

F. W. COMPTON.
HAY LOADER.
APPLICATION FILED MAR. 16, 1908.

944,017.

Patented Dec. 21, 1909.
3 SHEETS—SHEET 3.

Witnesses:
P. J. McAllister.
A. A. Olson.

Inventor;
Francis W. Compton.
by
Joshua R. H. Potts
Atty.

UNITED STATES PATENT OFFICE.

FRANCIS W. COMPTON, OF LAMPORT, COLORADO.

HAY-LOADER.

944,017.  Specification of Letters Patent. Patented Dec. 21, 1909.

Application filed March 16, 1908. Serial No. 421,378.

*To all whom it may concern:*

Be it known that I, FRANCIS W. COMPTON, a citizen of the United States, residing at Lamport, county of Baca, and State of Colorado, have invented certain new and useful Improvements in Hay-Loaders, of which the following is a specification.

My invention relates to hay loaders, that is to devices for gathering the hay from the swath or windrow and depositing it upon a hay-rack or wagon. Devices of this class as are now on the market are attached to the rear end of the hay-rack and deposit the hay upon the rear end of the rack only, from whence it must be shifted by hand to the front of the rack.

The object of my invention is to provide a device of the class mentioned, which will deliver the hay to any part of the rack desired. I accomplish this end by providing a loader adapted to travel beside the hay-rack and independently thereof and provided with a side delivery device.

A further object of my invention is to provide a hay loader which will gather the hay on the ground and deliver it to the top of the rack, and of such improved construction, that the rake bars may be much shorter than those usually employed.

Other objects will appear hereinafter.

With these objects in view my invention consists generally in a frame mounted upon wheels and comprising a horizontally disposed plate, a swinging plate hingedly connected to one side thereof and a rearwardly and downwardly inclined plate extending from the edge of the horizontal plate portion, in combination with an endless conveyer arranged on the horizontal and swinging plate portions and a plurality of reciprocating rakes for carrying the hay up said rearwardly inclined plate and depositing it upon the horizontal portion of the carrier.

My invention further consists in a hay loader having a plurality of parallel rake bars mounted upon a pair of crank shafts and means for driving said shafts.

My invention further consists in various details of construction and arrangements of parts all as will be hereinafter more fully described and particularly pointed out in the claim.

Figures 1, 4:
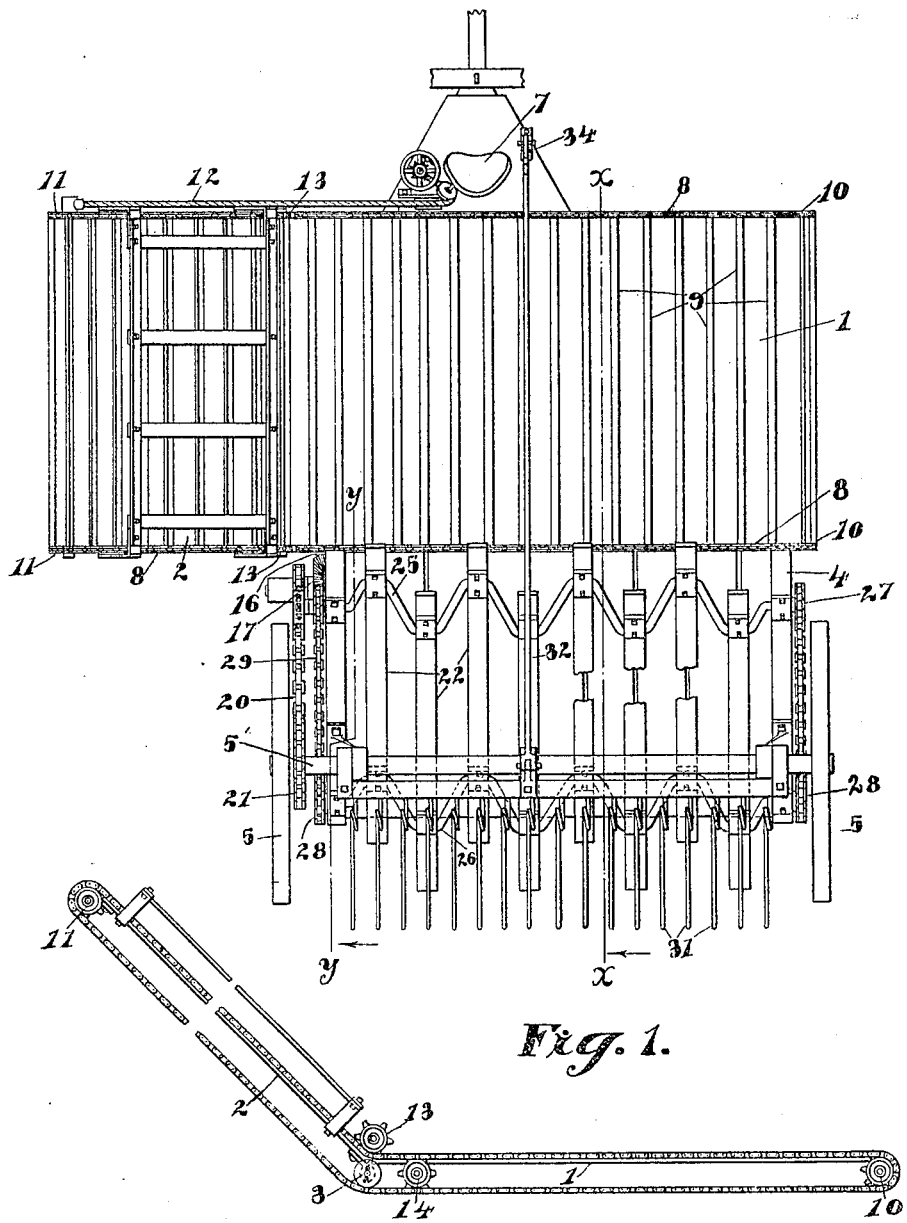
Figure 3:
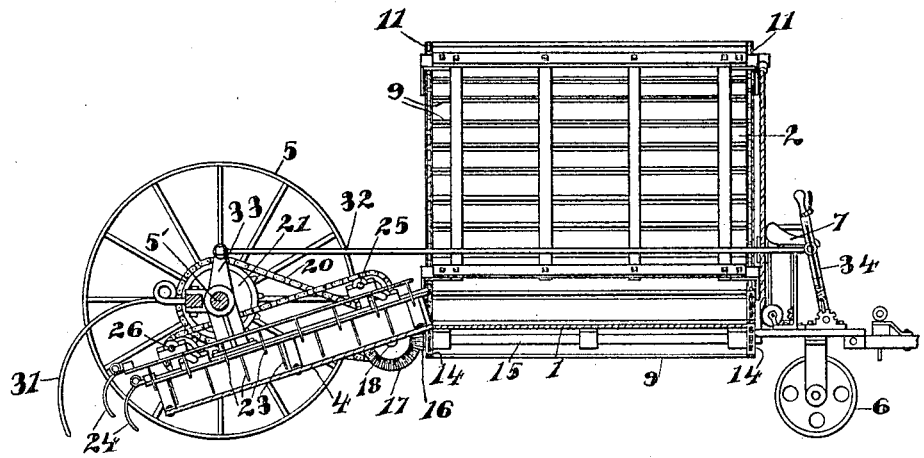
Figure 2:
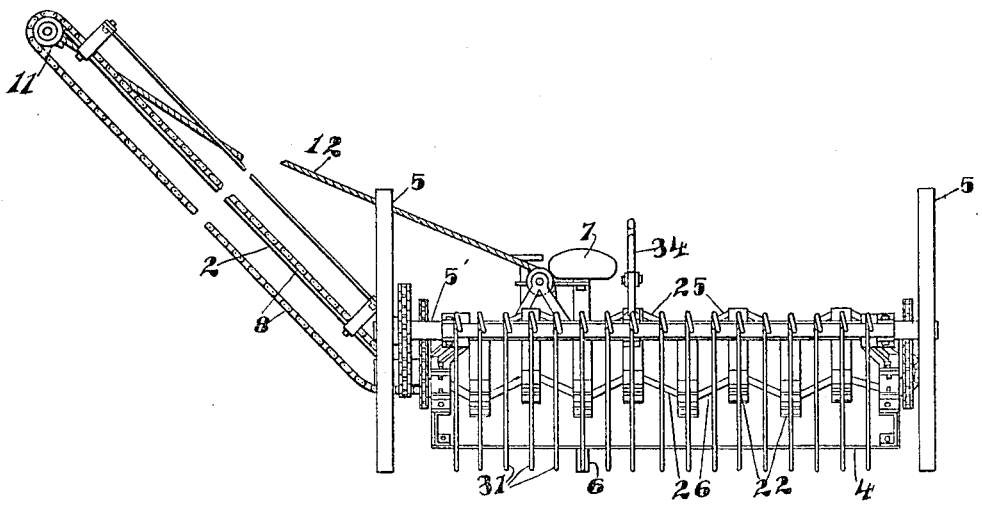
Figure 5:
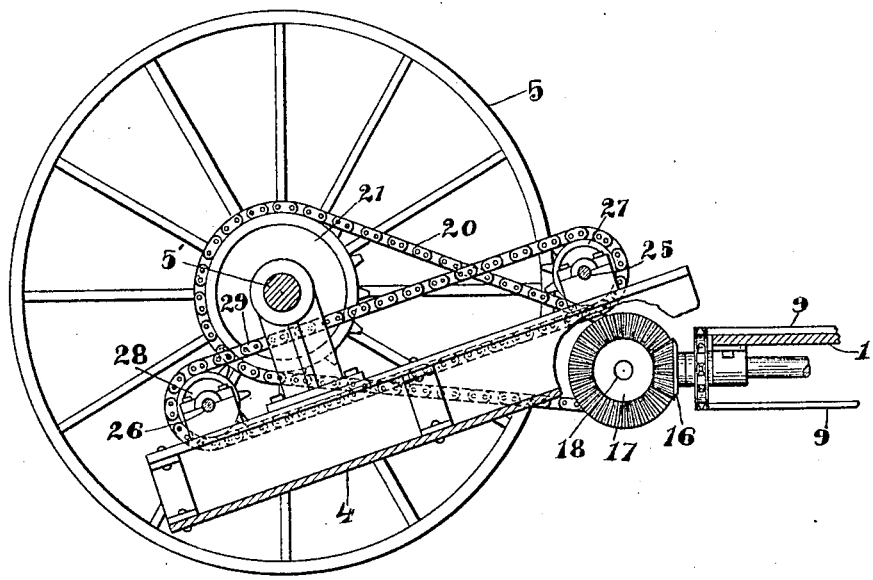
Figure 6:
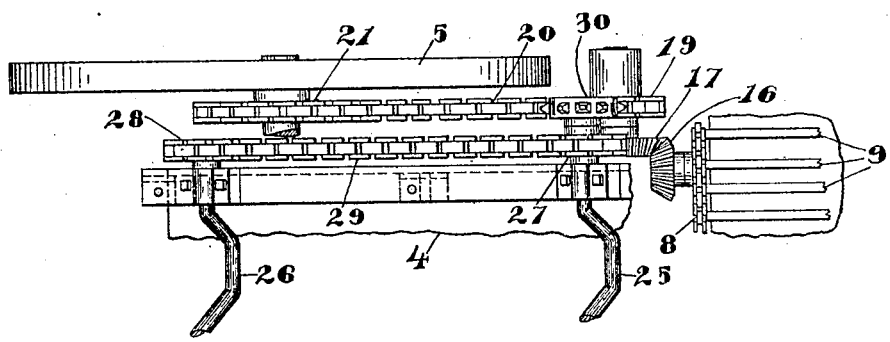

My invention will be more fully understood by reference to the accompanying drawings forming a part of this specification, and in which, Figure 1 is a plan view of a hay loader embodying my invention in its preferred form, Fig. 2 is a rear elevation thereof, Fig. 3 is a vertical longitudinal section thereof on substantially the line $x$—$x$ of Fig. 1, Fig. 4 is a detail elevation of the carrier, Fig. 5 is a detail longitudinal section on substantially the line $y$—$y$ of Fig. 1 and upon an enlarged scale, and Fig. 6 is a plan view of the portion of the device illustrated in Fig. 5.

The frame of the device consists principally of a horizontal plate 1 extending transversely of the machine, a plate 2 hingedly connected to one side of the plate 1 as at 3 and a plate 4 extending rearwardly and downwardly from the back edge of the plate 1. The frame is mounted upon the main wheels 5—5 arranged at the sides of the portion 4 and a smaller wheel 6 arranged beneath the driver's seat 7 which is forward of the plate 1. The plate or platform 1 is arranged but a short distance from the ground in order that the plate 4 and the rake bars which will be described hereinafter, may be quite short. Arranged upon the portions 1 and 2 of the frame is an endless conveyer which travels transversely of the machine and comprises a pair of sprocket chains 8 connected by a plurality of bars 9. The chains travel about sprocket wheels 10 and 11 arranged at the outer ends of the plates 1 and 2 respectively and are driven in a manner hereinafter described.

As the hay is deposited upon the platform 1 it is moved laterally thereon by the bars 9 of the conveyer and thence up the inclined portion 2 and deposited on the rack or wagon which is drawn along beside the loader and beneath the upper end of the portion 2. It is desirable to keep the delivery end of the loader as close to the top of the hay on the rack as is practical, and it is to this end that the portion 2 is hingedly connected to the portion 1, and suitable means are provided for raising and lowering the same and preferably from the driver's seat. To this end a cable or rope 12 is provided for raising the same.

13—13 indicate a pair of rollers or sprockets arranged above the hinge 3 to keep the conveyer close to the plates 1 and 2 and 14 indicates the sprockets for driving the conveyer. The conveyer is driven from one of the main wheels 5 in the following manner. The sprockets 14 are mounted upon a shaft 15 extending longitudinally of the machine beneath the plate 1 and having a bevel gear 16 fixed to its rear end. The gear 16 meshes with a similar gear 17 upon a short transverse shaft 18, and the shaft 18 is provided with a sprocket gear 19 which is connected by a chain 20 to a sprocket 21 fixed to the wheel 5, or shaft 5'.

Arranged above the inclined plate 4 and parallel therewith are a plurality of parallel rake bars 22. These are each provided with a plurality of straight teeth 23 rigidly fixed thereto and a curved rear tooth or tang 24. The bars 22 are mounted upon a pair of crank shafts 25 and 26. The former is located at the forward ends of the bars and the latter to the rear ends, and being driven simultaneously impart a parallel rotary motion to the rake bars. In this way I avoid the necessity of hinging the teeth to the forward ends of the bars as is the usual construction. The crank shafts 25 and 26 are each provided with a sprocket gear 27 and 28 respectively connected by a chain 29. The shaft 25 is also provided with a sprocket 30 arranged above the chain 20 and meshing therein, the rakes thus being driven from the wheel 5.

Arranged behind the plate 4 is an ordinary spring tooth rake 31 which may be raised and lowered as desired by a lever 34 arranged adjacent to the driver's seat and connected by a rod 32 and arm 33 to the rake. The rake 31 gathers the hay in position to be engaged by the teeth 24 which draw it onto the plate 4, the teeth 23 to carry it up the incline and deposit it on the platform 1 and the conveyer.

Having described my invention what I claim as new and desire to secure by Letters Patent, is, In a hay loader, a frame comprising a horizontal plate forming a platform, a second plate connected to the rear edge thereof and inclined downwardly and rearwardly therefrom and a third plate hingedly connected to one side of said horizontal plate and extending upwardly and outwardly therefrom, in combination with a single endless conveyer arranged on said horizontal plate portion and said third plate portion and means for gathering the hay, moving the same upwardly on said second plate portion and depositing it upon said conveyer, substantially as described.

In testimony whereof I have signed my name to this specification in the presence of two subscribing witnesses.

FRANCIS W. COMPTON.

Witnesses:
 WALTER T. BINDER,
 PETER LILLY.